(12) United States Patent
Kim

(10) Patent No.: US 9,683,654 B2
(45) Date of Patent: Jun. 20, 2017

(54) ELECTRONIC SHIFT SYSTEM FOR VEHICLE USING SMART KEY

(71) Applicant: Hyundai Motor Company, Seoul (KR)

(72) Inventor: Eun Sik Kim, Gwangmyeong-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/938,082

(22) Filed: Nov. 11, 2015

(65) Prior Publication Data

US 2016/0369889 A1    Dec. 22, 2016

(30) Foreign Application Priority Data

Jun. 18, 2015  (KR) .................. 10-2015-0086959

(51) Int. Cl.
| | | |
|---|---|---|
| *F16H 59/10* | (2006.01) | |
| *G05G 1/02* | (2006.01) | |
| *F16H 59/02* | (2006.01) | |

(52) U.S. Cl.
CPC ....... *F16H 59/105* (2013.01); *F16H 59/0217* (2013.01); *F16H 59/0278* (2013.01); *G05G 1/025* (2013.01); *F16H 2059/0239* (2013.01); *F16H 2059/0295* (2013.01)

(58) Field of Classification Search
CPC ....... B60R 25/04; B60R 25/066; B60R 25/24; F16H 2059/026; F16H 2059/048; F16H 2059/0295; F16H 59/00; F16H 59/02; F16H 59/04; F16H 59/08; F16H 59/10; F16H 59/044; F16H 59/105; F16H 59/0217; F16H 59/0278; F16H 61/22; F16H 63/34; F16H 2061/326; G05G 1/02; G05G 1/025; G05G 1/06
See application file for complete search history.

(56) References Cited

U.S. PATENT DOCUMENTS 5,161,422 A * 11/1992 Suman ................. B60K 20/04
                                                      180/315
5,528,953 A    6/1996 Steinle et al.
(Continued)

FOREIGN PATENT DOCUMENTS

JP    2001-277893 A    10/2001
KR    20-2009-0007061 U    7/2009
(Continued)

*Primary Examiner* — David M Fenstermacher
*Assistant Examiner* — Joseph H Brown
(74) *Attorney, Agent, or Firm* — Morgan Lewis & Bockius LLP

(57) ABSTRACT

An electronic shift system for a vehicle may include a card smart key including a permanent magnet, a base bracket formed with a guide slot for insertion and mounting of the smart key, the guide slot being configured to guide movement of the smart key mounted therein, and a Printed Circuit Board (PCB) fixedly disposed on the base bracket, the PCB configured to identify a mounting state of the smart key based on whether the permanent magnet approaches thereto when the smart key is inserted into the guide slot and to identify a shift stage based on variation in position of the permanent magnet when the smart key mounted in the guide slot is moved along the guide slot, so as to output a signal corresponding to the identified shift stage to a transmission control unit.

15 Claims, 9 Drawing Sheets

(56) References Cited

U.S. PATENT DOCUMENTS

| | | | |
|---|---|---|---|
| 6,756,698 B2 * | 6/2004 | Shamoto | B60R 25/04 307/10.1 |
| 7,730,991 B2 * | 6/2010 | Grundey | B60R 25/04 180/287 |
| 2008/0028807 A1 | 2/2008 | Frohne et al. | |

FOREIGN PATENT DOCUMENTS

| KR | 10-2010-0123150 A | 11/2010 |
|---|---|---|
| KR | 10-2012-0012276 A | 2/2012 |
| KR | 10-1333721 B1 | 11/2013 |
| KR | 10-2014-0060707 A | 5/2014 |
| KR | 10-1410664 B1 | 6/2014 |
| KR | 10-1480619 B1 | 1/2015 |

* cited by examiner

ELECTRONIC SHIFT SYSTEM FOR VEHICLE USING SMART KEY

CROSS-REFERENCE TO RELATED APPLICATION

The present application claims priority to Korean Patent Application No. 10-2015-0086959, filed Jun. 18, 2015, the entire contents of which is incorporated herein for all purposes by this reference.

BACKGROUND OF THE INVENTION

Field of the Invention

The present invention relates to an electronic shift system for a vehicle using a smart key, which enables a driver to perform shifting using a card-type smart key.

Description of Related Art

In general, a vehicle, equipped with an automatic transmission, enables a gear of a target shift range to be automatically operated by controlling hydraulic pressure within a preset shift range depending on the driving speed of the vehicle.

The automatic transmission makes a gear ratio using a hydraulic circuit, a planetary gear, and frictional elements, in order to implement shifting. A Transmission Control Unit (TCU) is in charge of the control of these components.

A Shift By Wire (hereinafter referred to as "SBW") system is an electronic shift system for a vehicle that includes no mechanical connection structure, such as a cable, between a transmission and a shift lever, unlike a conventional mechanical shift system. In the SBW system, electronic transmission control is implemented in such a way that, when a sensor value, generated when an electronic shift lever or a button is operated, is transmitted to a Transmission Control Unit (TCU), a solenoid or an electric motor is operated by an electronic command signal from the TCU to apply hydraulic pressure to a hydraulic circuit of each shift stage, or to intercept the hydraulic pressure.

Accordingly, the SBW-based automatic transmission has the advantage of enabling easier implementation of shifting to, e.g., a Drive (D), Reverse (R), Neutral (N), or Park (P) range by transmitting an electrical signal, which indicates the driver's shifting intention, to the TCU via the simplified operation of the electronic shift lever or the button. In addition, the SBW-based automatic transmission has the advantage of providing a wide space between the driver's seat and the passenger seat because a reduction in the size of the shift lever is possible.

Meanwhile, a lever-type electronic shift system, which implements shifting using a lever, has no remarkable advantage compared to a mechanical shift system because the shift lever is operated similar to a mechanical shift lever. Moreover, the lever-type electronic shift system is disadvantageous in that it still occupies a large console space, thus causing a relative reduction in the space for peripherals such as, for example, a cup holder and, in particular, in that the protruding lever may thrust the passenger's body in the event of an accident, thus inflicting injury on the passenger.

In addition, a button-type electronic shift system, which implements shifting using buttons, has the advantage of providing easier shifting than the lever-type electronic shift system and the efficient utilization of console space because the installation position thereof can be freely changed to another position (e.g., the center fascia), rather than the console, and also has the advantage of having no risk of contact with the passenger's body in the event of an accident, thus preventing injury of the passenger. However, the button-type electronic shift system requires a large number of buttons because different buttons are used to operate the respective shift stages P, R, N, and D, which is inconvenient to operate. In particular, the large number of buttons is disadvantageous in terms of layout.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an electronic shift system for a vehicle using a smart key, which enables a driver to perform shifting using a card-type smart key, thereby eliminating the inconvenience of operation and the disadvantageous layout, which are pointed out as disadvantages of a button-type shift system, and reducing the risk of loss of the smart key.

According to various aspects of the present invention, an electronic shift system for a vehicle may include a card smart key including a permanent magnet, a base bracket formed with a guide slot for insertion and mounting of the smart key, the guide slot being configured to guide movement of the smart key mounted therein, and a Printed Circuit Board (PCB) fixedly disposed on the base bracket, the PCB configured to identify a mounting state of the smart key based on whether the permanent magnet approaches thereto when the smart key is inserted into the guide slot and to identify a shift stage based on variation in position of the permanent magnet when the smart key mounted in the guide slot is moved along the guide slot, so as to output a signal corresponding to the identified shift stage to a transmission control unit.

The smart key may include a body mounted in the guide slot to move along the guide slot, the body being formed with a key slot parallel to the guide slot, and the permanent magnet being coupled to the body, and a rotator rotatably coupled to the body via a hinge shaft, and the rotator may protrude upward from a console when the body is mounted in the guide slot.

The base bracket may include a bottom plate fixedly disposed on a vehicle body below the console, and two guide plates vertically protruding from the bottom plate, the two guide plates may extend in a front-rear direction of the vehicle so as to be in parallel with each other, the guide slot may be a space between the two guide plates, and the PCB may be fixedly disposed on at least one of the two guide plates.

The base bracket may be fixedly disposed on a vehicle body below the console, and the console may be formed with a console aperture for penetration of the smart key.

The guide slot may extend in a front-rear direction or a left-right direction of the vehicle.

The smart key may be mounted at a middle position in a longitudinal direction of the guide slot when initially inserted into the guide slot and, simultaneously, the PCB may output a Null-stage signal, and the PCB may output at least one shift-stage signal from among P-stage, R-stage, N-stage, and D-stage signals based on variation in the position of the permanent magnet when the smart key is moved along the guide slot.

The smart key may further include a return spring wound around the hinge shaft to be coupled at both ends of the hinge shaft to the body and the rotator, the return spring providing the rotator with elastic force such that the body and the rotator form a straight line shape.

The smart key may further include a body magnet and a rotator magnet fixedly disposed at facing regions of the body and the rotator respectively, the body magnet and the rotator magnet being magnetically coupled to each other to maintain a straight line shape of the body and the rotator.

The body magnet and the rotator magnet may be configured to exert magnetic attraction therebetween.

The system may further include a return magnet coupled to one surface of the rotator, and an electromagnet coupled to a top surface of the console, in which the electromagnet may be formed to extend in a longitudinal direction of the guide slot, and the electromagnet may be divided into an attractive section having a polarity opposite to that of the return magnet to exert magnetic attraction therebetween, and repulsive sections having the same polarity as that of the return magnet to exert magnetic repulsion therebetween.

The attractive section of the electromagnet may be located in a middle region in a longitudinal direction of the electromagnet and nay be magnetically coupled with the return magnet when the rotator is rotated toward the console after the smart key is initially inserted into the guide slot, and the repulsive sections of the electromagnet may be located respectively at both sides of the attractive section to return the smart key to the attractive section of the electromagnet when the smart key is moved along the guide slot.

The system may further include an actuator fixedly disposed on the base bracket so as to face a corresponding one of the guide plates, operation of the actuator configured to be controlled by the PCB, and an actuator rod configured to be moved forward to or backward away from the corresponding guide plate via operation of the actuator, the actuator rod simultaneously penetrating the corresponding guide plate and the smart key to fix a position of the smart key when moved forward, and being separated from the smart key and the corresponding guide plate when moved backward.

The actuator rod may include a connecting rod configured to be moved forward or backward upon receiving power of the actuator, and upper and lower rods connected to a tip end of the connecting rod, the upper rod may apply pressure to a lower end of the rotator to rotate the rotator relative to the body when moved forward, and the lower rod may penetrate the key slot of the body and the corresponding guide plate when moved forward.

At least one guide plate among the two guide plates, facing the actuator, may be formed with an upper hole and a lower hole for penetration of the upper rod and the lower rod.

At least one guide plate among the two guide plates, relatively distant from the actuator, may be formed with an incision to allow rotation of the rotator.

The console aperture may include a slot extending along the guide slot to allow movement of the smart key, and a rotation aperture connected to the slot to allow rotation of the rotator.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
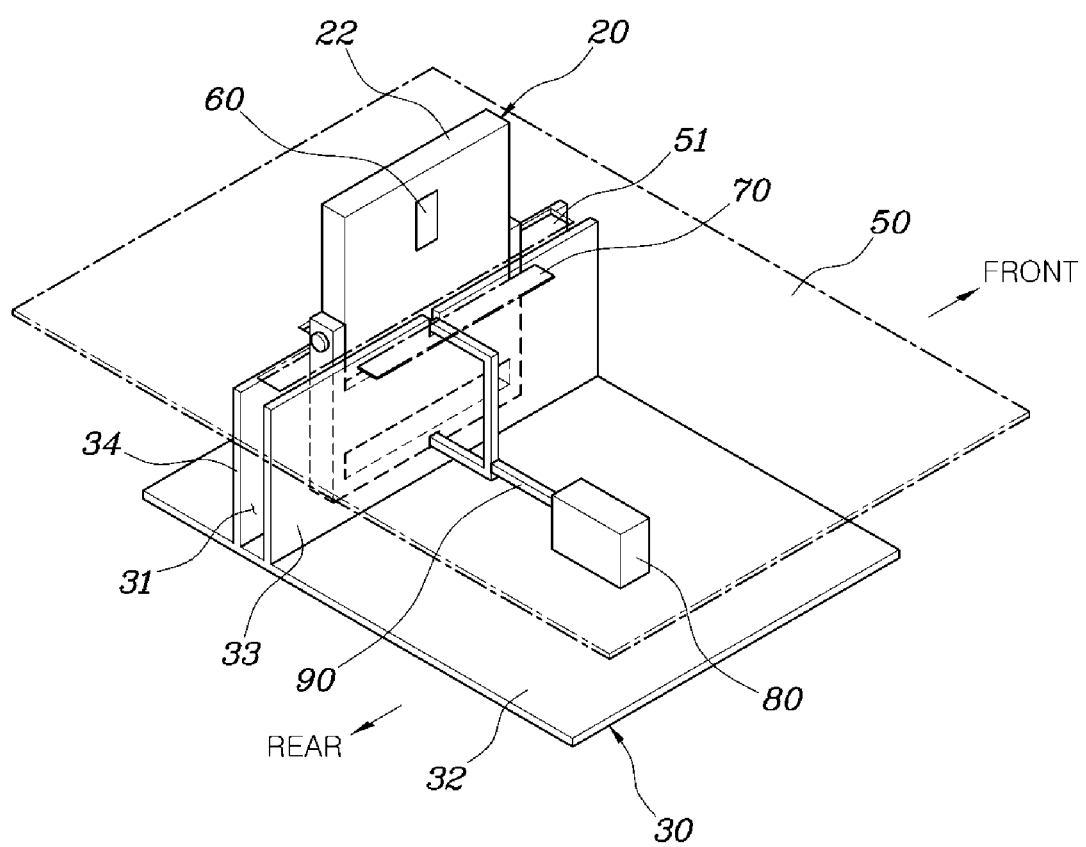
FIG. 1 is a perspective view of an exemplary electronic shift system for a vehicle using a smart key according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The electronic shift system for the vehicle using the smart key according to the present invention is installed on the console located at one side of the driver and is configured to enable a driver to perform shifting using a smart key having a card shape.

That is, the electronic shift system for the vehicle using the smart key according to various embodiments of the present invention, as exemplarily illustrated in FIGS. 1 to 11, includes a card-type smart key 20 having a permanent magnet 10, a base bracket 30 formed with a guide slot 31, into which the smart key 20 is inserted and mounted, the guide slot 31 being configured to guide the movement of the smart key 20 mounted therein, and a Printed Circuit Board (PCB) 40 fixedly installed on the base bracket 30, the PCB 40 serving to identify the mounting state of the smart key 20 based on whether the permanent magnet 10 approaches thereto when the smart key 20 is inserted into the guide slot 31 and to identify any one of shift stages (e.g., a P-stage, R-stage, N-stage, or D stage) based on variation in the position of the permanent magnet 10 when the smart key 20 mounted in the guide slot 31 is moved along the guide slot 31 so as to output a signal corresponding to the identified shift stage to a Transmission Control Unit (TCU).

When the signal corresponding to the identified shift stage is output from the PCB 40, the output signal is transmitted to the TCU and, in turn, a solenoid or an electric motor is operated by an electronic command signal from the TCU to apply hydraulic pressure to a hydraulic circuit of each shift stage, or to intercept the hydraulic pressure. As such, the electronic shift system implements electronic transmission control.

The smart key 20 includes a body 21 and a rotator 22.

The body 21 is mounted in the guide slot 31 and, after being mounted in the guide slot 31, is moved along the guide slot 31 by the driver's operation. The body 21 is formed with a key slot 23 parallel to the guide slot 31, and the permanent magnet 10 is fitted into the key slot 23.

The rotator 22 is configured to be rotated relative to the body 21. To this end, the rotator 22 is coupled to the body 21 via a hinge shaft 24.

Once the body 21 has been mounted in the guide slot 31, the rotator 22 protrudes upward from the console 50. The upper portion of the body 21 including the hinge shaft 24 may protrude into the interior of the vehicle.

The smart key 20 further includes a return spring 25, which is wound around the hinge shaft 24 such that one end thereof is coupled to the body 21 and the other end thereof is coupled to the rotator 22.

The body 21 and the rotator 22 of the smart key 20 need to together form a straight line shape so long as no external force is applied to the rotator 22. The return spring 25 provides the rotator 22 with elastic force to allow the body 21 and the rotator 22 to form a straight line shape.

When external force is applied to the rotator 22, the rotator 22 is rotated relative to the body 21 about the hinge shaft 24. In this state, when the external force applied to the rotator 22 is removed, the rotator 22 returns to the original state thereof forming the straight line shape with the body 21 by restoration force received from the return spring 25.

The smart key 20 further includes a body magnet 26 and a rotator magnet 27.

The body magnet 26 is fixed at a prescribed position on the body 21 facing the rotator 22. The rotator magnet 27 is fixed at a prescribed position on the rotator 22 facing the body 21. The body 21 and the rotator 22 continue to form the straight line shape via the coupling of the body magnet 26 and the rotator magnet 27.

That is, the return spring 25 serves to provide the rotator 22 with elastic force such that the rotator 22 forms a straight line shape along with the body 21. The body magnet 26 and the rotator magnet 27 serve to fix the body 21 and the rotator 22, which form the straight line shape, to each other so as to maintain the straight line shape. To this end, the body magnet 26 and the rotator magnet 27 may have opposite polarities to exert magnetic attraction therebetween.

The base bracket 30 includes a bottom plate 32 fixedly installed to the vehicle body below the console 50 and two guide plates 33 and 34 vertically protruding from the bottom plate 32.

The two guide plates 33 and 34 extend in the front-rear direction of the vehicle so as to be in parallel with each other. The space between the two guide plates 33 and 34 is the guide slot 31. The PCB 40 is fixedly installed to any one of the two guide plates 33 and 34. The various embodiments of the present invention illustrate a configuration in which the PCB 40 is installed to the guide plate 34 which is relatively far from an actuator, but is not limited thereto.

The guide slot 31 is configured to extend in the front-rear direction or the left-right direction of the vehicle. In the present invention, a configuration in which the guide slot 31 extends in the front-rear direction of the vehicle is described by way of example.

The base bracket 30 is fixedly installed to the vehicle body below the console 50, and the console 50 is formed with a console aperture 51, through which the smart key 20 penetrates.

The console aperture 51 is comprised of a slot 51a, which extends along the guide slot 31 to allow the smart key 20 mounted in the guide slot 31 to be moved along the guide slot 31 by the driver's operation, and a rotation aperture 51b connected to the slot 51a to allow the rotation of the rotator 22 of the smart key 20.

The smart key 20 is mounted at a middle position in the longitudinal direction of the guide slot 31 when it is initially inserted into the guide slot 31. At this time, the PCB 40 outputs a Null-stage signal. When the smart key 20, mounted in the guide slot 31, is moved along the guide slot 31 by the driver's operation, the PCB 40 outputs any one shift stage signal among P-stage, R-stage, N-stage, and D-stage signals based on variation in the position of the permanent magnet 10.

In addition, the electronic shift system of the present invention further includes a return magnet 60 coupled to one surface of the rotator 22 of the smart key 20 and an electromagnet 70 coupled to the top surface of the console 50.

The electromagnet 70 is formed to extend in the longitudinal direction of the guide slot 31. In addition, the electromagnet 70 is divided into an attractive section 71, which has the polarity opposite to that of the return magnet 60 to exert magnetic attraction therebetween, and repulsive sections 72, which have the same polarity as that of the return magnet 60 to exert magnetic repulsion therebetween.

That is, the attractive section 71 of the electromagnet 70 is located in the middle region in the longitudinal direction of the electromagnet 70. When the smart key 20 is initially inserted into the guide slot 31 and the rotator 22 is subsequently rotated toward the console 50, the attractive section 71 of the electromagnet 70 is magnetically coupled with the return magnet 60. In this way, the initial position of the smart key 20 is determined.

The repulsive sections 72 of the electromagnet 70 are located respectively at both sides of the attractive section 71. When the smart key 20 is moved along the guide slot 31 to deviate from the attractive section 71, magnetic repulsion is exerted between the corresponding repulsive section 72 of the electromagnet 70 and the return magnet 60. Thereby, the repulsive section 72 of the electromagnet 70 causes the smart key 20 to return to the attractive section 71 of the electromagnet 70 when the external force applied to the smart key 20 is removed.

In addition, the electronic shift system of the present invention further includes an actuator 80, which is fixedly installed on the base bracket 32 so as to face the guide plate 33, operation of the actuator 80 being controlled by the PCB 40, and an actuator rod 90, which is moved forward to or backward away from the guide plate 33 via the operation of the actuator 80, the actuator rod 90 simultaneously penetrating the guide plate 33 and the smart key 20 to fix the position of the smart key 20 when moved forward, and being separated from the smart key 20 and the guide plate 33 when moved backward.

The actuator 80 may be a linear motor having a movable element configured to perform straight movement, without being limited thereto.

The actuator rod 90 includes a connecting rod 91 which is moved forward or backward upon receiving the power of the actuator 80 and upper and lower rods 92 and 93 connected to the tip end of the connecting rod 91.

When the connecting rod 91 is moved forward, the upper rod 92 applies pressure to the lower end of the rotator 22 to rotate the rotator 22 relative to the body 21, and the lower rod 93 penetrates the key slot 23 of the body 21 and the guide plate 33 to fix the position of the smart key 20.

Specifically, when the connecting rod 91 is moved forward, the upper rod 92 applies pressure to the lower end of the rotator 22 below the hinge shaft 24. As the upper rod 92 applies pressure to the rotator 22, the rotator 22 is rotated about the hinge shaft 24 to thereby be oriented perpendicular to the body 21.

As the rotator 22 is rotated relative to the body 21 when the body 21 of the smart key 20 is inserted into the guide slot 31 of the base bracket 30 as described above, the driver can identify the state in which the smart key 20 is correctly inserted into the guide slot 31.

In addition, once the rotator 22 of the smart key 20 has been rotated to thereby be oriented perpendicular to the body 21, the contact area between the rotator 22 and the driver's palm increases while the driver is performing shifting by gripping the rotator 22 with the hand, which advantageously enables easier shifting.

When the driver performs shifting by gripping the rotator 22 rotated relative to the body 21, the key slot 23 formed in the body 21 and the lower rod 93 inserted into the key slot 23 serve to guide the movement of the smart key 20.

In addition, among the two guide plates 33 and 34, any one guide plate, e.g. guide plate 33 facing the actuator 80 is formed with an upper hole 33a and a lower hole 33b for the penetration of the upper rod 92 and the lower rod 93. Any one guide plate, e.g. guide plate 34, which is relatively distant from the actuator 80 than the other guide plate 33, is formed with an incision 34a to allow the rotation of the rotator 22 of the smart key 20.

Hereinafter, the operation of the various embodiments according to the present invention will be described.

Figure 2:
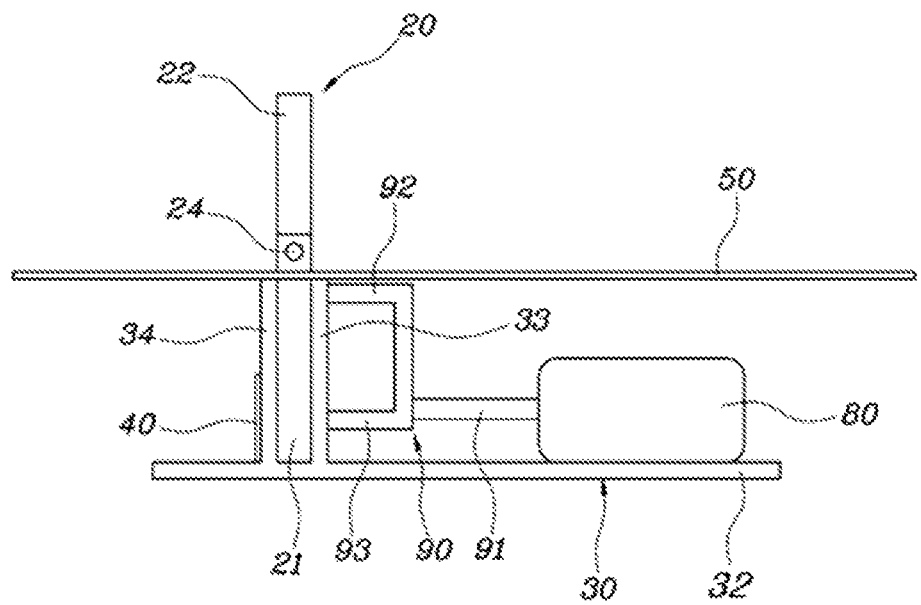
FIG. 2, FIG. 3, and FIG. 4 are, respectively, a front view, a left side view, and an exploded perspective view of FIG. 1.
Figure 3:
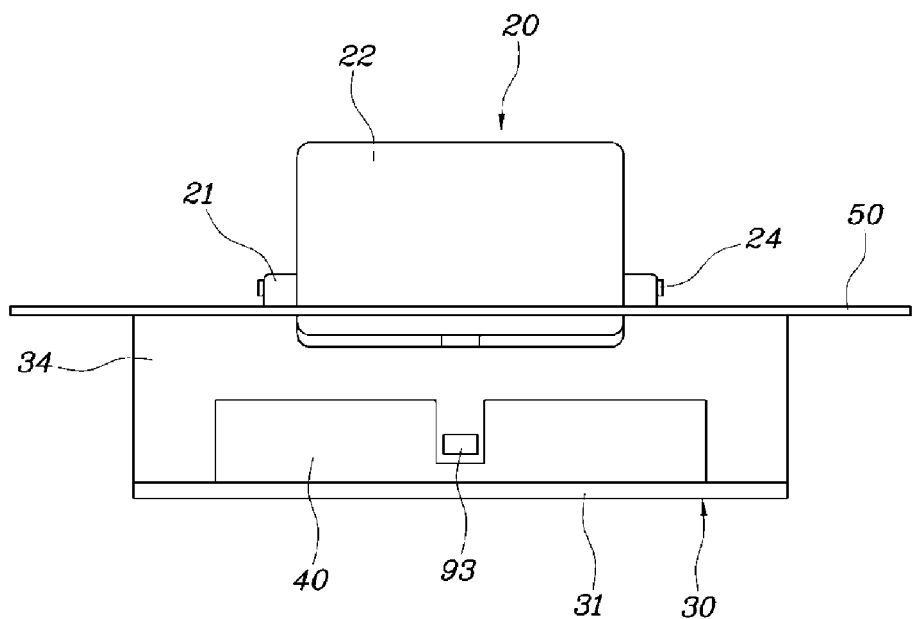
Figure 4:
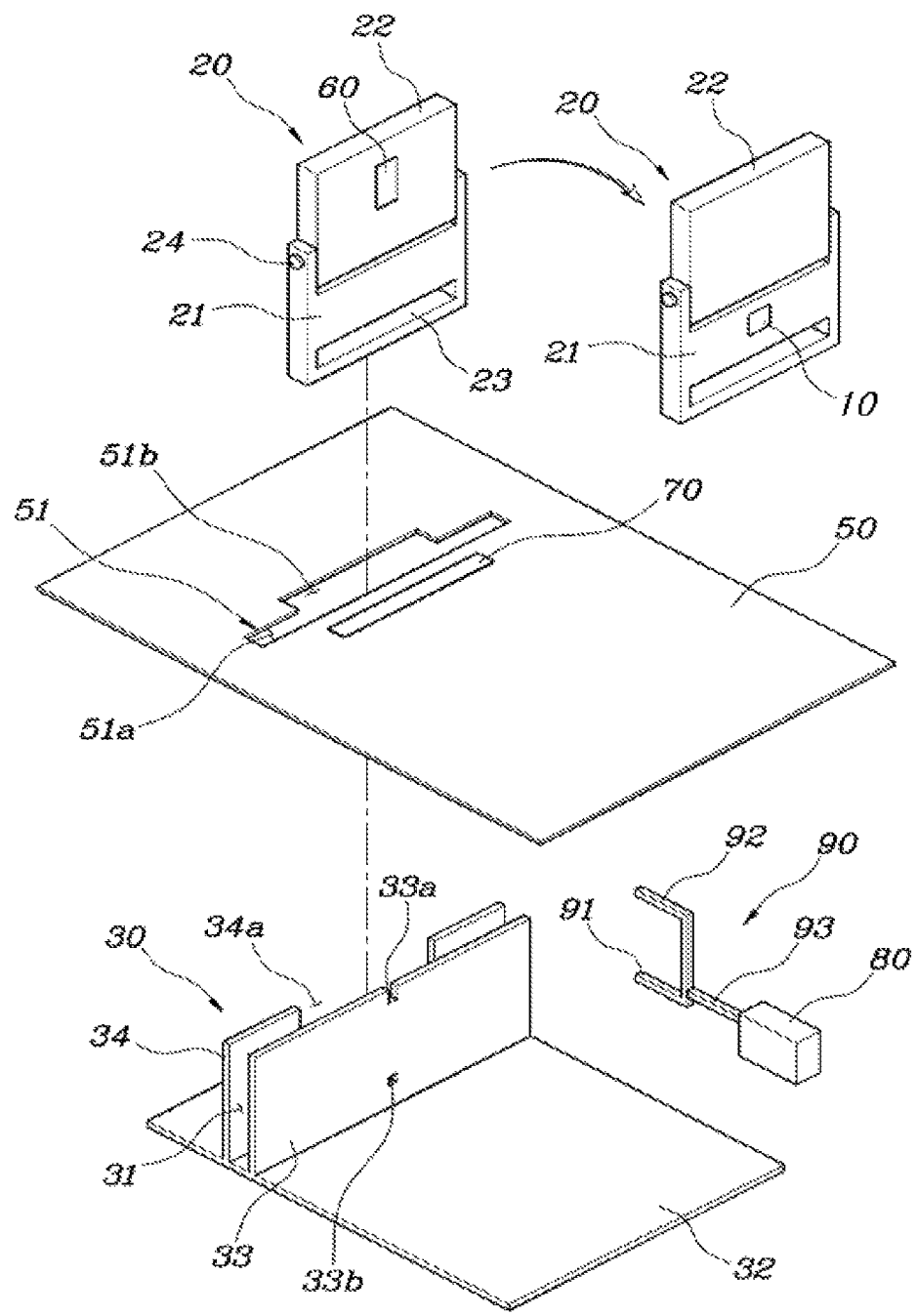
Figure 5:
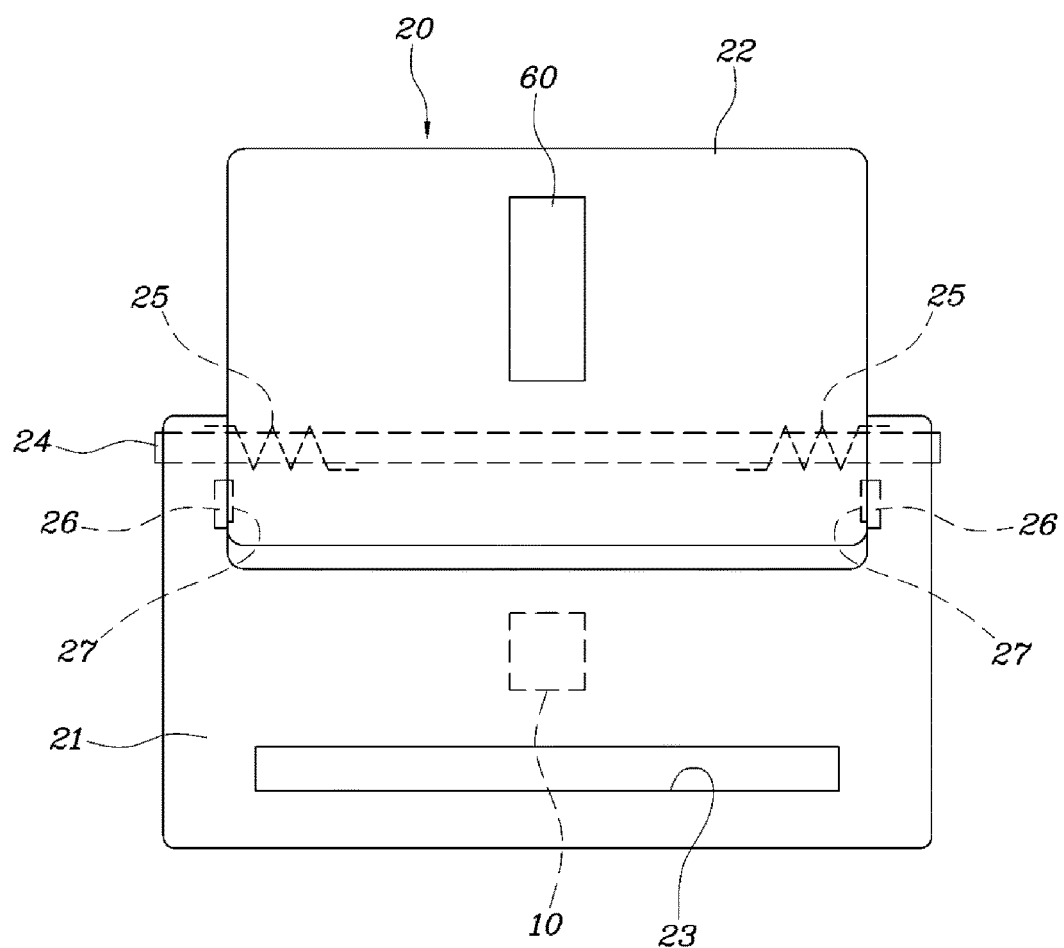
FIG. 5 and FIG. 6 are views illustrating the smart key according to the present invention.
Figure 6:
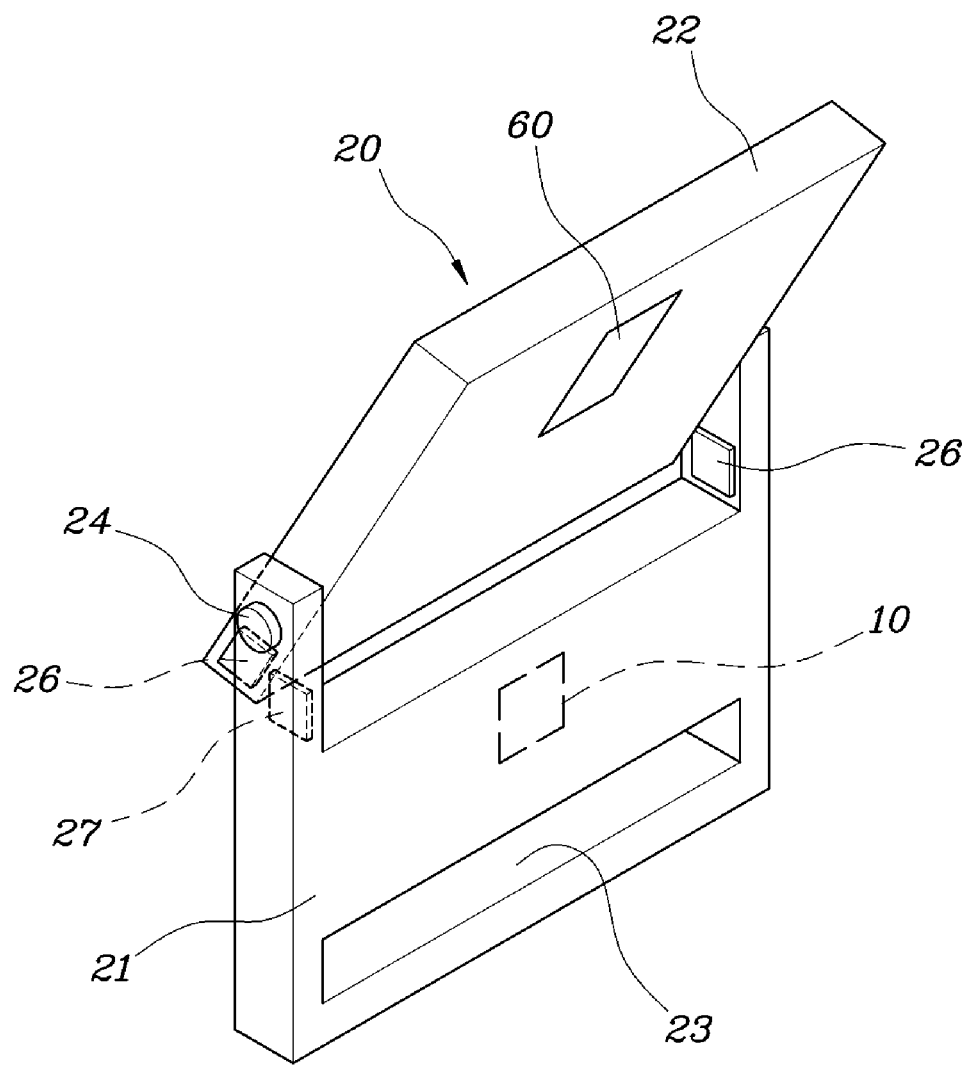
Figure 7:
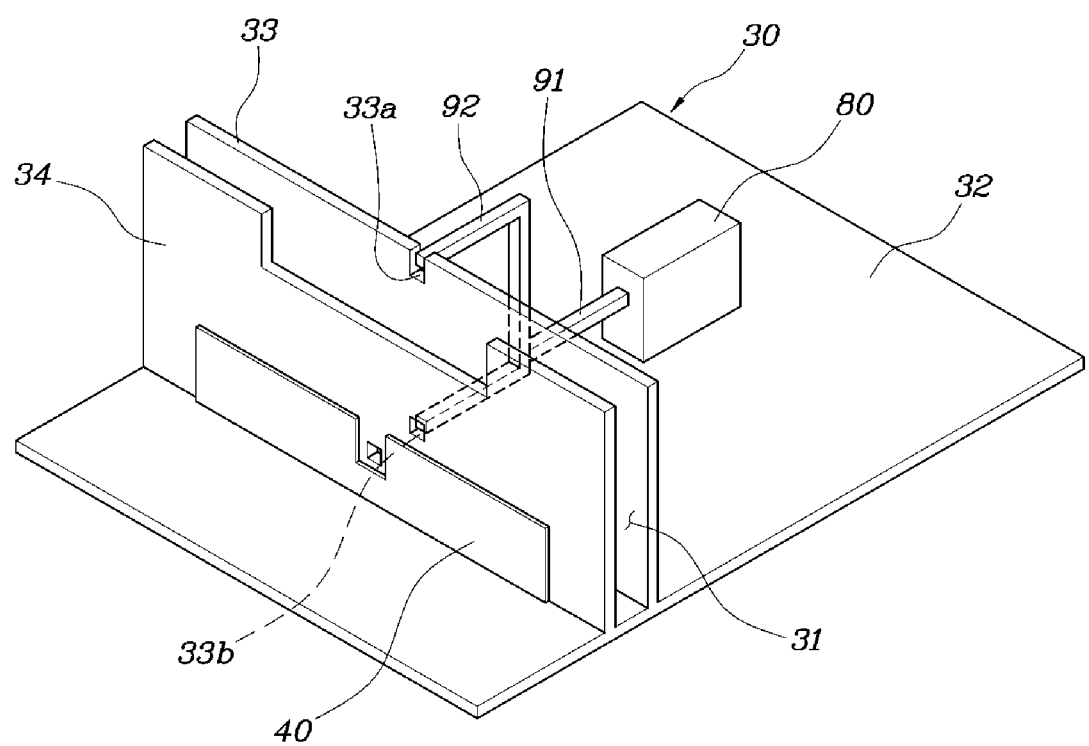
FIG. 7 and FIG. 8 are views illustrating a base bracket, a return market, and an electromagnet of the exemplary electronic shift system according to the present invention.

When the driver, who possesses the smart key 20 in the form of a card, gets in a vehicle and inserts the body 21 of the smart key 20 into the guide slot 31 as exemplarily illustrated in FIG. 2 after turning on the ignition, or when the driver first inserts the body 21 of the smart key 20 into the guide slot 31 and, thereafter, turns on the ignition, the PCB 40 identifies, via the permanent magnet 10, that the smart key 20 has been mounted.

Meanwhile, when the ignition is turned on, current flows to the electromagnet 70 mounted to the console 50, thereby magnetizing the electromagnet 70.

Figure 9:
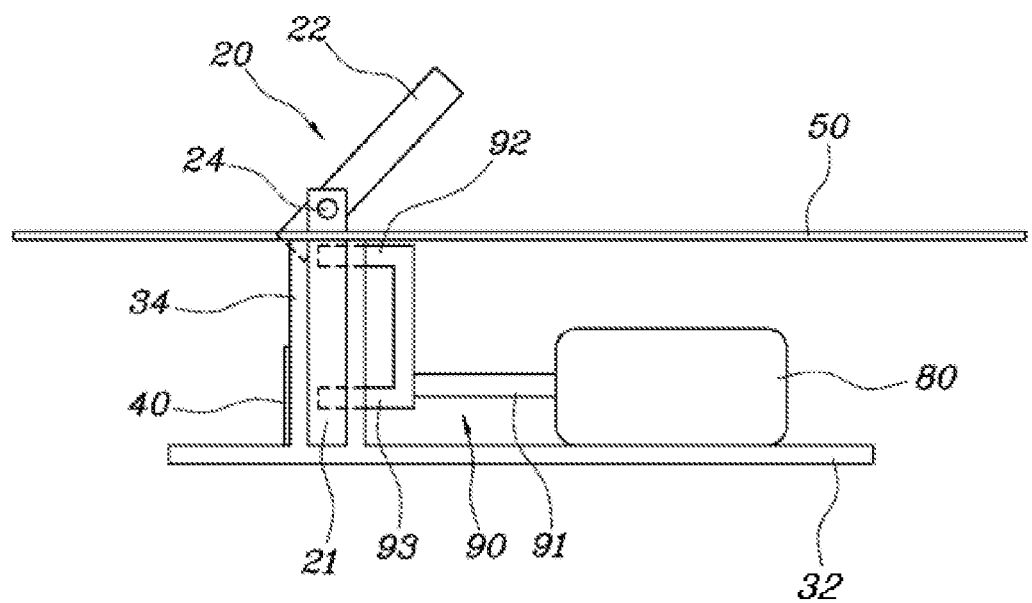
FIG. 9, FIG. 10, and FIG. 11 are views illustrating the process of operating the exemplary electronic shift system for the vehicle using the smart key according to the present invention.
Figure 10:
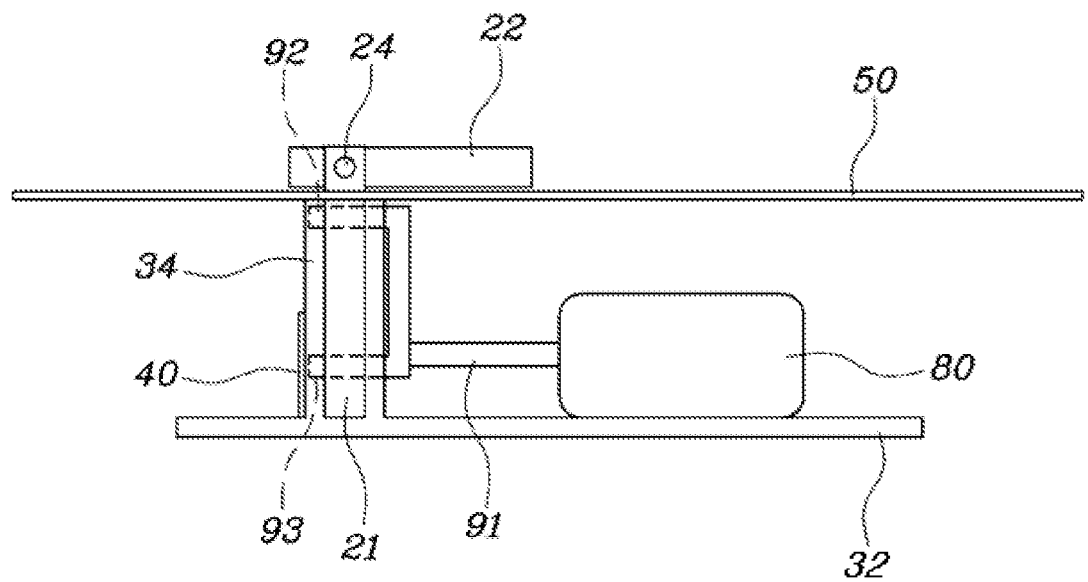

Once the PCB 40 has identified that the smart key 20 has been mounted, the PCB 40 controls the actuator 80 to operate the same, and the actuator rod 90 is moved forward toward the smart key 20 via the operation of the actuator 80 as exemplarily illustrated in FIG. 9.

When the actuator rod 90 is moved forward, the upper rod 92 penetrates the upper hole 33a to apply pressure to the lower end of the rotator 22, thus causing the rotator 22 to be rotated about the hinge shaft 24 so as to be closer to the electromagnet 70. The completely rotated rotator 22 is oriented perpendicular to the body 21 as exemplarily illustrated in FIG. 10. At this time, the return magnet 60 is magnetically coupled with the attractive section 71 of the electromagnet 70 as exemplarily illustrated in FIG. 8. In this way, the initial position of the smart key 20 is set to enable the driver to perform shifting.

Figure 8:
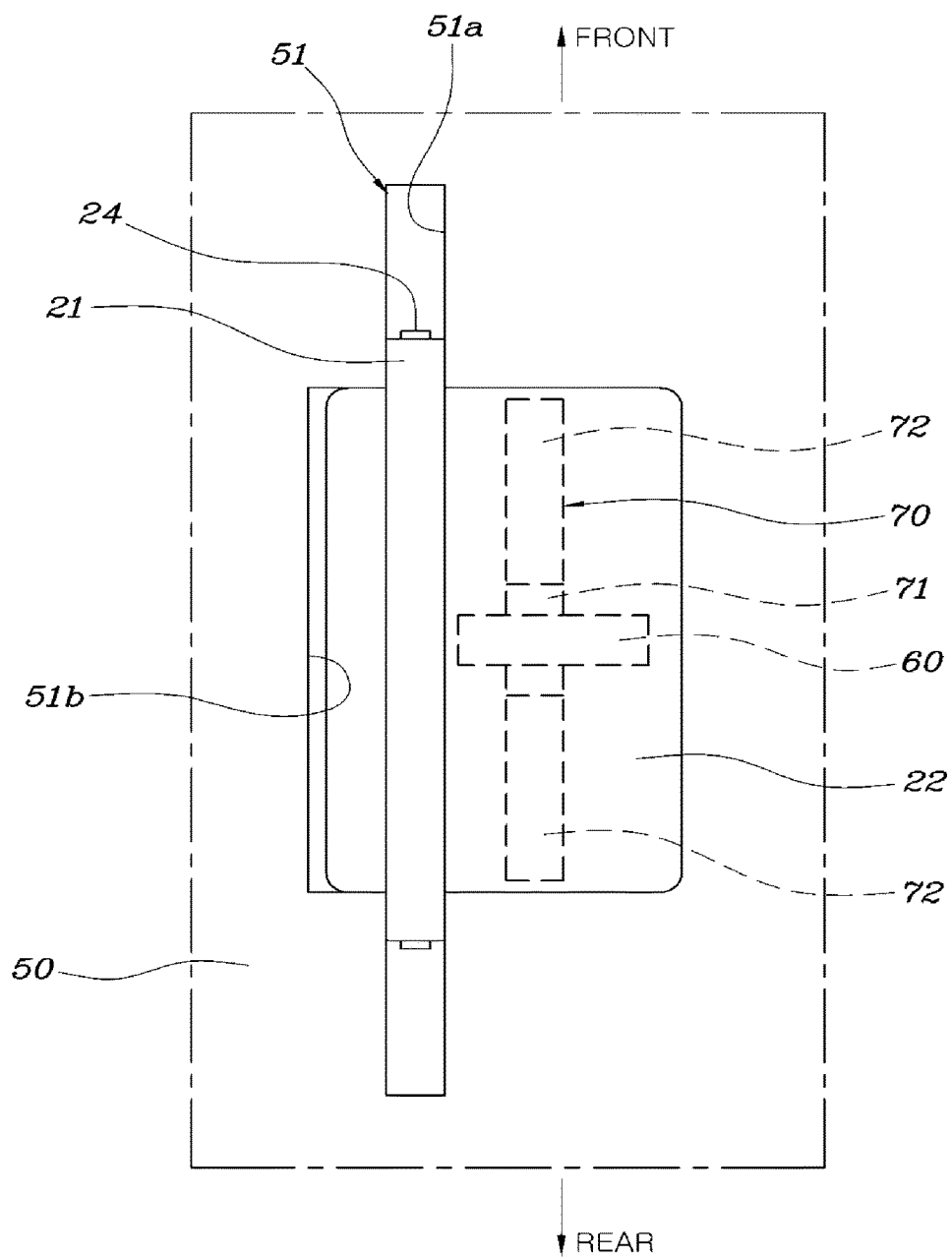
Figure 11:
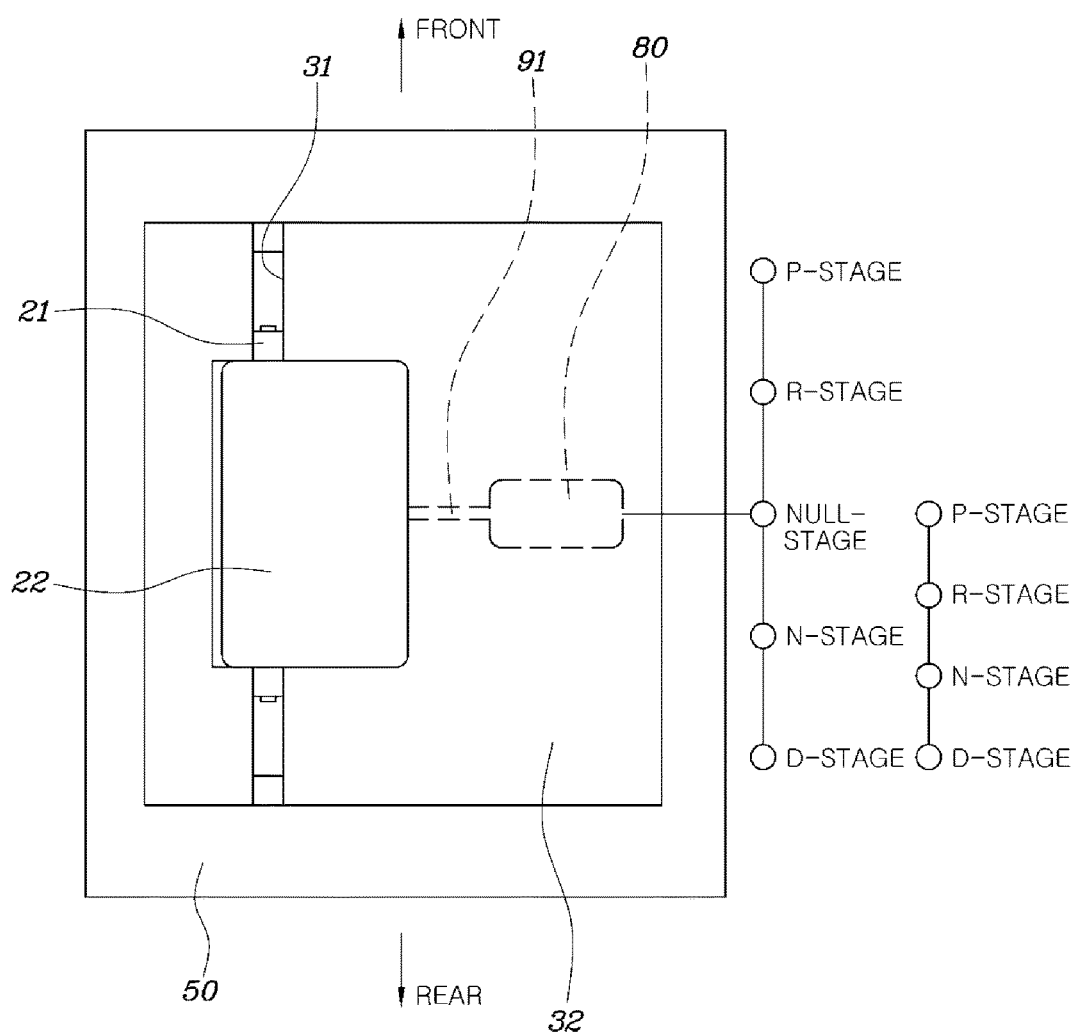

When the smart key 20 is initially inserted into the guide slot 31, the smart key 20 is located at the middle position in the longitudinal direction of the guide slot 31 as exemplarily illustrated in FIGS. 8 and 11. At this time, the return magnet 60 is magnetically coupled with the attractive section 71 of the electromagnet 70, and the PCB 40 outputs a Null-stage signal or a P-stage signal.

When the driver moves the smart key 20 forward or backward along the guide slot 31 by gripping the rotator 22 with the hand in the state in which the return magnet 60 is magnetically coupled with the attractive section 71 of the electromagnet 70, the position of the permanent magnet 10 varies. At this time, the PCB 40 outputs any one shift stage signal from among P-stage, R-stage, N-stage, and D-stage signals based on variation in the position of the permanent magnet 10.

Then, when the driver removes his/her hand from the rotator 22 moved along the guide slot 31, the smart key 20 returns to a Null stage by magnetic repulsion between the return magnet 60 and the repulsive section 72 of the electromagnet 70. The smart key 20, returned to the Null stage, may remain at the position of the Null stage by magnetic attraction between the return magnet 60 and the attractive section 71 of the electromagnet 70.

Then, when the driver turns off the ignition after completing vehicle driving, the flow of current to the electromagnet 70 is intercepted, which demagnetizes the electromagnet 70, and the actuator rod 90 is moved backward via the operation of the actuator 80. Thereby, the rotator 22, which has been rotated so as to be oriented perpendicular to the body 21, returns to the original position, at which the rotator 22 and the body 21 together form a straight line shape, by the restoration force of the return spring 25. Simultaneously, as the body magnet 26 and the rotator magnet 27 are magnetically coupled with each other, the body 21 and the rotator 22 maintain the straight line shape to return to the state illustrated in FIG. 2. In the returned state illustrated in FIG. 2, the driver can pull out the smart key 20 out of the guide slot 31.

As is apparent from the above description, an electronic shift system according to the present invention is configured to enable a driver to perform shifting using a card-type smart key. The electronic shift system has the advantage of ensuring easier and simpler shifting than a lever-type or button-type shift system, and also has the advantage of achieving a reduced price and minimized layout by eliminating the requirement for a plurality of buttons, resulting in the efficient utilization of the surrounding console space.

In addition, the electronic shift system has the advantages of enabling the rapid implementation of shifting owing to ease and convenience of the shifting and of considerably reducing driver fatigue attributable to shifting.

In addition, the electronic shift system has the advantage of reducing the risk of loss of the smart key as a result of performing shifting using the smart key.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electronic shift system for a vehicle, the system comprising:
 a smart key including a permanent magnet;
 a base bracket formed with a guide slot for insertion and mounting of the smart key, the guide slot being configured to guide movement of the smart key mounted therein; and
 a Printed Circuit Board (PCB) fixedly disposed on the base bracket, the PCB configured to identify a mounting state of the smart key based on whether the permanent magnet approaches thereto when the smart key is inserted into the guide slot and to identify a shift stage based on variation in position of the permanent magnet when the smart key mounted in the guide slot is moved along the guide slot, so as to output a signal corresponding to the identified shift stage to a transmission control unit,
 wherein the smart key includes:
  a body mounted in the guide slot to move along the guide slot, the body being formed with a key slot parallel to the guide slot, and the permanent magnet being coupled to the body; and
  a rotator rotatably coupled to the body via a hinge shaft, and
 the rotator protrudes upward from a console when the body is mounted in the guide slot.

2. The system according to claim 1, wherein:
 the base bracket includes a bottom plate fixedly disposed on a vehicle body below the console, and two guide plates vertically protruding from the bottom plate,
 the two guide plates extend in a front-rear direction of the vehicle so as to be in parallel with each other,
 the guide slot is a space between the two guide plates, and
 the PCB is fixedly disposed on at least one of the two guide plates.

3. The system according to claim 2, further comprising:
 an actuator fixedly disposed on the base bracket so as to face a corresponding one of the guide plates, operation of the actuator configured to be controlled by the PCB; and
 an actuator rod configured to be moved forward to or backward away from the corresponding guide plate via operation of the actuator, the actuator rod simultaneously penetrating the corresponding guide plate and the smart key to fix a position of the smart key when moved forward, and being separated from the smart key and the corresponding guide plate when moved backward.

4. The system according to claim 3, wherein:
 the actuator rod includes:
  a connecting rod configured to be moved forward or backward upon receiving power of the actuator; and
  upper and lower rods connected to a tip end of the connecting rod,
 the upper rod applies pressure to a lower end of the rotator to rotate the rotator relative to the body when moved forward, and
 the lower rod penetrates the key slot of the body and the corresponding guide plate when moved forward.

5. The system according to claim 4, wherein at least one guide plate among the two guide plates, facing the actuator, is formed with an upper hole and a lower hole for penetration of the upper rod and the lower rod.

6. The system according to claim 2, wherein at least one guide plate among the two guide plates, distant from the actuator, is formed with an incision to allow rotation of the rotator.

7. The system according to claim 1, wherein the base bracket is fixedly disposed on a vehicle body below the console, and the console is formed with a console aperture for penetration of the smart key.

8. The system according to claim 7, wherein the console aperture includes:
 a slot extending along the guide slot to allow movement of the smart key; and
 a rotation aperture connected to the slot to allow rotation of the rotator.

9. The system according to claim 1, wherein the guide slot extends in a front-rear direction or a left-right direction of the vehicle.

10. The system according to claim 1, wherein:
 the smart key is mounted at a middle position in a longitudinal direction of the guide slot when initially inserted into the guide slot and, simultaneously, the PCB outputs a Null-stage signal, and
 the PCB outputs at least one shift-stage signal from among P-stage, R-stage, N-stage, and D-stage signals based on variation in the position of the permanent magnet when the smart key is moved along the guide slot.

11. The system according to claim 1, wherein the smart key further includes a return spring wound around the hinge shaft to be coupled at both ends of the hinge shaft to the body and the rotator, the return spring providing the rotator with elastic force such that the body and the rotator form a straight line shape.

12. The system according to claim 1, wherein the smart key further includes a body magnet and a rotator magnet fixedly disposed at facing regions of the body and the rotator respectively, the body magnet and the rotator magnet being magnetically coupled to each other to maintain a straight line shape of the body and the rotator.

13. The system according to claim 12, wherein the body magnet and the rotator magnet are configured to exert magnetic attraction therebetween.

14. The system according to claim 1, further comprising:
 a return magnet coupled to one surface of the rotator; and
 an electromagnet coupled to a top surface of the console,
 wherein the electromagnet is formed to extend in a longitudinal direction of the guide slot, and
 wherein the electromagnet is divided into an attractive section having a polarity opposite to that of the return magnet to exert magnetic attraction therebetween, and repulsive sections having the same polarity as that of the return magnet to exert magnetic repulsion therebetween.

15. The system according to claim 14, wherein:
 the attractive section of the electromagnet is located in a middle region in a longitudinal direction of the electromagnet and is magnetically coupled with the return magnet when the rotator is rotated toward the console after the smart key is initially inserted into the guide slot, and the repulsive sections of the electromagnet are located respectively at both sides of the attractive section to return the smart key to the attractive section of the electromagnet when the smart key is moved along the guide slot.

* * * * *